UNITED STATES PATENT OFFICE.

GEORGE K. OSBORN, OF BROOKLYN, NEW YORK, ASSIGNOR OF ONE-HALF HIS RIGHT TO FREDERICK B. GODDARD, OF SAME PLACE.

IMPROVEMENT IN PREPARING MENHADEN FISH FOR FOOD.

Specification forming part of Letters Patent No. 150,183, dated April 28, 1874; application filed March 16, 1874.

*To all whom it may concern:*

Be it known that I, GEORGE K. OSBORN, of Brooklyn, Kings county, New York, have invented an Improvement in Preparing Menhaden Fish, of which the following is a specification:

My invention may be described as menhaden fish salted or smoked, and so prepared as to present certain peculiar, novel, and marked advantages over the same fish as heretofore prepared for use as food. These advantages consist chiefly, first, in retaining only those parts of the fish which contain essentially all the edible portions, freed from such of the bones as are mainly objectionable, and which alone have hitherto prevented this superior and abundant fish from becoming a staple and favorite food; second, in the size and form of the parts thus retained.

The fish menhaden, also known as "mossbunkers," "hard-heads," "bony-fish," &c., are nearly allied to the shad, both species belonging to the same family and genus, (the genus *Alosa.*) Menhaden are caught in vast quantities along the shores of the New England and Middle States during about seven months of the year, principally for their oil, and for fertilizing purposes. Some of the larger manufactories along the coast have a capacity for thus reducing many thousand bushels of these fish daily. Although possessing a flavor and delicacy hardly equaled by any fish in American waters, but few menhaden, comparatively, are eaten at present, owing entirely to the great number of bones they contain. If, then, this difficulty can be overcome in some simple and inexpensive manner, this enormous food-supply, instead of being, as now, perverted to inferior uses, may be utilized and made available as a low-priced, but palatable and nutritious, food, suited to daily consumption. Various unsuccessful attempts have heretofore been made to this end; processes have been invented for softening the bones of fish by means of heat and acid, but these chemical manipulations appear to impair the flavor of the fish, and are costly.

Now, in most osseous fishes there are numerous small and forked bones interspersed among the muscles, having no connection with the main bony system or skeleton of the fish, but serving as points of support to the muscles. This is eminently the case with the menhaden. But many, and in fact most, of the bones of this nature found in this fish are soft and fine, mere cartilaginous filaments when cooked, which may be eaten without danger or inconvenience. Such, however, is not the case with the bones that belong to the skeleton of this fish, and the difficulty is, that when the fish is cooked with only the ordinary preparation it is impossible to distinguish by their appearance between the bones which are harmless and inoffensive and those which are dangerous and troublesome. If, then, those bones which belong to the main bony structure or system of the fish be removed, few remain capable of giving annoyance; the fine cartilaginous threads are not perceptible in the mouth, and the fish may be eaten with confidence and enjoyment. In short, the objection to these fish on account of their superabundant bones is entirely overcome when they are subjected to this simple treatment. I do not confine myself to any exact routine in preparing the fish in this manner. If preferred, the fish may be first scaled, its head, fin-bones, and tail cut off, and its entrails taken out, all in the ordinary way; after which the backbone, with its processes, and the rib-bones, may be carefully removed, thus leaving the edible parts of the fish in two pieces, each of general ovate form, thicker at the broad end. But, as before stated, it is desirable that the process should be as simple and inexpensive as possible, and I, therefore, generally adopt a still more speedy and direct process, which under ordinary circumstances could not be economically applied to any other fish than the menhaden, because the latter are very abundant, and such portions as are not retained as food need not be wasted, being quite as good, if not, proportionately, better for fertilizing purposes than the whole fish, as now used.

My usual mode of preparation is as follows: I first scale the fish; then, laying it on its side, I place a sharp knife at right angles with the backbone, just behind the collar-bone and pectoral fin, and make an incision straight down to the backbone on the upper or dorsal portion of the fish, which incision I continue down toward the belly, cutting, however, less deeply as I approach the latter, in order to avoid the ribs. I now turn the edge of the knife at nearly right angles with the first incision, and draw it down to the tail. The slice I thus cut off contains substantially all the edible part of the fish on that side. If any portion of the ribs remain on the slice, I remove them with the knife. I then turn the fish, and repeat the process on the other side. The result is, that the entire bony structure or skeleton of the fish, with its inferior parts, is left entire in one mass, and all the edible parts are in the two pieces or slices, which are of general ovate form, slightly thicker on the sides which lie nearest the dorsal parts of the fish than on the belly sides, and thickest at the broad or forward end. These slices contain merely the finer and soft bones referred to above.

In addition to this improvement in respect to the bones, other marked advantages may be claimed for the fish in this condition. These pieces are most convenient in shape and size for frying or broiling, and are also equally appropriate in this respect for helping about at table. They are wholly edible, and, therefore, none of the butter or other material used in preparing them for table is absorbed by inedible portions to be thrown away. They can be packed much closer in this form than fish of an equal size in a natural form can be packed—closer, even, than in any other practical form which can be given them—thus reducing the cost of the packages required to contain them; and as there are no inedible portions of the fish to absorb salt or pickle, less is required to preserve them. Again, for salting, these fish in this form may be so closely packed that their natural juices are sufficient, with salt, to make the amount of brine requisite for their preservation. The fish thus pickled in their own juices possess more of their natural flavor and nutritious qualities than when the brine is diluted with water.

I disclaim desiccated fish of any kind which have been previously deprived of their bones. I also disclaim depriving any fish of its skeleton or main bony system, except such as resemble the menhaden in osseous structure; but I do claim—

1. The process of preparing menhaden fish for food by depriving them of their main bony skeleton, substantially as and for the purpose described.

2. As a new article of trade and manufacture, the menhaden fish salted, when deprived of such bones as, and for the purposes, set forth and described.

3. As a new article of manufacture and trade, menhaden fish in two pieces, having substantially the form as described, and cured by salting.

GEO. K. OSBORN.

Witnesses:
L. J. ADAMS,
GEO. A. SANDHAM.